(12) United States Patent
Lee et al.

(10) Patent No.: US 12,344,151 B2
(45) Date of Patent: Jul. 1, 2025

(54) VEHICLE SEAT CONTROL SYSTEM AND METHOD THEREFOR

(71) Applicants: HYUNDAI MOTOR COMPANY, Seoul (KR); Kia Corporation, Seoul (KR)

(72) Inventors: Tae Hoon Lee, Suwon-si (KR); Byeong Seon Son, Seoul (KR); Jihwan Kim, Seoul (KR); Sanghoon Park, Incheon (KR); Sang Ho Kim, Incheon (KR); Sejin Park, Namyangju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 323 days.

(21) Appl. No.: 17/983,861

(22) Filed: Nov. 9, 2022

(65) Prior Publication Data
US 2024/0001831 A1    Jan. 4, 2024

(30) Foreign Application Priority Data
Jun. 29, 2022   (KR) .................... 10-2022-0079461

(51) Int. Cl.
| | |
|---|---|
| B60N 3/06 | (2006.01) |
| B60N 2/02 | (2006.01) |
| B60N 2/90 | (2018.01) |
| B60N 2/005 | (2006.01) |

(52) U.S. Cl.
CPC ........... B60N 3/063 (2013.01); B60N 2/0292 (2013.01); B60N 2/995 (2018.02); *B60N 2002/0055* (2013.01)

(58) Field of Classification Search
CPC . B60N 3/063; B60N 2002/0055; B60N 2/995
See application file for complete search history.

(56) References Cited

U.S. PATENT DOCUMENTS

| | | | | |
|---|---|---|---|---|
| 6,663,184 B2 * | 12/2003 | Hagiike | ............... | B60N 2/0292 |
| | | | | 297/217.3 |
| 2002/0158497 A1 * | 10/2002 | Nivet | .................. | B64D 11/064 |
| | | | | 297/330 |

FOREIGN PATENT DOCUMENTS

| | | | | | |
|---|---|---|---|---|---|
| CN | 102917916 B | * | 4/2015 | ............... | B60N 2/01 |
| GB | 2580230 A | * | 7/2020 | ............. | B60N 2/002 |

* cited by examiner

*Primary Examiner* — Daniel J Colilla
(74) *Attorney, Agent, or Firm* — MORGAN, LEWIS & BOCKIUS LLP

(57) ABSTRACT

A vehicle seat control system includes a front seat, a rear seat associated with the front seat back and forth, a footrest mounted on a rear of a seatback of the front seat, a leg-rest mounted on a seat cushion of the rear seat associated with the front seat back and forth, an individual seat switch unit mounted on the front seat and the rear seat, respectively, and an integrated controller configured to determine current state information of the front seat and the rear seat through sensor units mounted on each of the front seat and the rear seat and to perform interference avoidance control in consideration of current state information of a seat associated with a specific seat when receiving a request for an operation of the footrest or the leg-rest from a switch unit of the specific seat.

18 Claims, 13 Drawing Sheets

(Case1: INTERFERENCE OCCURRENCE BETWEEN FOOTREST AND LEG-REST)

(Case2: OCCURRENCE OF COLLISION/INJURY WHEN DRIVER'S SEAT
/PASSENGER'S SEAT (FS) MOVES REARWARD)

(A) LEG-REST OPEN OPERATION RESTRICTION (B) FOOTREST CLOSE OPERATION RESTRICTION (S220 : FRONT SEAT (FS) REARWARD MOVEMENT STATE)

(S230 : PERFORM INTERFERENCE AVOIDANCE CONTROL)

VEHICLE SEAT CONTROL SYSTEM AND METHOD THEREFOR

CROSS-REFERENCE TO RELATED APPLICATION

The present application claims priority to Korean Patent Application No. 10-2022-0079461 filed on Jun. 29, 2022, the entire contents of which is incorporated herein for all purposes by this reference.

BACKGROUND OF THE PRESENT DISCLOSURE

Field of the Present Disclosure

The present disclosure relates to a vehicle seat control system and a method therefor, and more particularly, to a vehicle seat control system and a method therefor a multi-functional vehicle seat control system and a method therefor to which a footrest and a leg-rest are applied at the same time.

Description of Related Art

Vehicles have additional value of a resting space beyond the existing concept of a convenient means of transportation, and thus, various functions for rest and convenience of passengers are being added to seats.

For example, various functions, such as multi-purpose sliding, a hot wire, air conditioning, seatback angle adjustment, and massage, are applied to seats of a vehicle for passenger relaxation. Here, to improve the convenience of passengers, a relax (also called relaxation) function, an easy access function, or the like, which automatically adjusts a posture of a seat when only one button operates in one-touch mode, has been applied.

Here, the relax refers to a function of adjusting an angle of a seatback and a seat cushion with one touch so that a posture of a passenger becomes a zero-gravity neutral posture. Furthermore, the easy access includes a function of automatically sliding a seat to secure space when passengers get on/off, and an automatic memory seat function that automatically adjusts a spacing and height angle of the seat to suit a body shape of a driver.

Furthermore, there are a footrest and a leg-rest as convenient specifications which may be applied to seats, but there is no case of simultaneously applying the footrest and leg-rest to a conventional passenger vehicle due to a narrow internal space.

Meanwhile, with the recent spread of electric vehicles and the development of autonomous driving technology, the simultaneous application of footrests and leg-rests is being considered to secure space in a vehicle and provide a resting environment for passengers.

However, the footrest mounted on a rear of a front seat (FS) operates rearward and the leg-rest mounted on a front of a rear seat (RS) operates forward, so that the operating areas overlap each other to cause interference (collision) (see FIG. 4).

The operation of the one-touch mode under the interference occurrence condition in which the footrest and the leg-rest overlap may cause rear interference due to the automatic sliding and reclining of the corresponding seat, resulting in damage to parts or injury to passengers.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle seat control system and a method therefor including advantages of restricting a requested operation when there is an interference occurrence condition considering current state information between seats when a request for operation is input from any seat of an electric seat to which a footrest and a leg-rest are simultaneously applied.

Furthermore, the present disclosure has been made in an effort to provide a vehicle seat control system and a method therefor including advantages of performing associated inter-seat interference avoidance control while a requested operation is restricted due to interference occurrence.

An exemplary embodiment provides a vehicle seat control system, including: a front seat; a rear seat associated with the front seat back and forth; a footrest mounted on a rear of a seatback of the front seat; a leg-rest mounted on a seat cushion of the rear seat associated with the front seat back and forth; an individual seat switch unit mounted on the front seat and the rear seat, respectively; and an integrated controller configured to determine current state information of the front seat and the rear seat through sensor units mounted on each of the front seat and the rear seat and to perform interference avoidance control in consideration of current state information of a seat associated with a specific seat when receiving a request for an operation of the footrest or the leg-rest from a switch unit of the specific seat.

The individual seat switch unit may include an operation system for operating a one-touch mode including a relax mode and an easy access mode, sliding, reclining, height adjusting, and a memory seat mode, and may further include an operation system for operating at least one of the footrest, the leg-rest, a getting on mode, and a getting off mode.

The sensor unit may include: a seat position sensor configured for measuring a seat position according to a sliding operation distance of a slider; a seating detection sensor configured for detecting whether a passenger is accommodated through a pressure of a seat cushion; a footrest angle sensor configured for measuring an open rotation angle based on a closed state 0° of the footrest; and a leg-rest angle sensor configured for measuring the open rotation angle based on the closed state 0° of the leg-rest.

The vehicle seat control system may further include: an individual seat controller provided for each seat to control a function of a corresponding seat; and a display providing a seat adjustment screen through a screen or popping up a guidance message generated according to the interference avoidance control.

The individual seat controller may be configured to control the operation of the corresponding seat and then transmit the current state information collected through the sensor unit to the integrated controller, to integrally manage the current state information of the front seat and the rear seat.

The individual seat controller may transmit a function operation request to the integrated controller when receiving the function operation request from the individual seat switch unit, and receive an interference avoidance control signal considering the current state information of the front seat and the rear seat to control the function of the front seat and the rear seat.

The integrated controller may store, in a memory, an interference avoidance control logic considering all possible interference conditions in a passenger's usage condition when the operation of the footrest or the leg-rest is requested.

The integrated controller may be configured to determine whether there is the interference occurrence condition based on the current state information according to the interference avoidance control logic when receiving a function operation request of one seat among the front seat and the rear seat, through the individual seat switch unit, and restrict a requested function operation and output a non-operation message through the display when there is the interference occurrence condition.

The integrated controller may first perform an associated operation required for the requested function operation to remove the interference occurrence condition and then permit the requested function operation when there is no passenger accommodated in an associated seat when the requested function operation is restricted, guide an interference occurrence reason and the associated operation required for avoiding the interference through the display when there is a passenger accommodated in an associated seat when restricting the requested function operation, and first perform the associated operation required for avoiding the interference to remove the interference occurrence condition and then permit the requested function operation when an instruction to execute the associated operation is input.

Another exemplary embodiment provides a method of controlling a vehicle seat to which a footrest of a front seat FS and a leg-rest of a rear seat RS are simultaneously applied, the method including: receiving a request for operating a footrest or a leg-rest according to an operation of an individual seat switch unit of a passenger of a rear seat RS; determining whether there is an interference occurrence condition based on the current state information of the front seat FS associated with the rear seat RS; restricting the requested operation of the footrest or the leg-rest when the interference occurrence condition is satisfied; and outputting a non-operation guidance message for the request for operation of the footrest or the leg-rest through a display.

It is determined that there is the interference occurrence condition when at least one of the following conditions are met: the leg-rest is in an open state in the case of the request to operate the footrest, or the footrest is in an open state in the case of the request to operate the leg-rest; an angle of the seatback of the front seat FS exceeds a first reference value T1 and is in a state lying rearward thereof; and a position of the front seat FS exceeds a second reference value T2 and crosses rearward thereof.

The method of controlling a vehicle seat may further include: after outputting the non-operation guidance message through the display, checking whether a passenger of the front seat FS is accommodated based on the current state information; first performing an associated operation required for the requested operation of the footrest or the leg-rest to remove the interference occurrence condition when the passenger of the front seat FS is not in a accommodated state; and controlling the requested operation of the footrest or the leg-rest.

The removing of the interference occurrence condition may include at least one of the following: closing the leg-rest or the footrest in an open state; adjusting the angle of the seatback of the front seat FS to be within the first reference value T1; and moving the position of the front seat FS forward within the second reference value T2.

The removing of the interference occurrence condition may further include: displaying an associated operation request input menu through the display when the passenger of the front seat FS is accommodated; and first performing the associated operation required for the requested operation of the footrest or the leg-rest to remove the interference occurrence condition when receiving the association control request input through the display.

Various exemplary embodiments provides a method of controlling a vehicle seat to which a footrest of a front seat FS and a leg-rest of a rear seat RS are simultaneously applied, the method including: receiving a rearward movement request of the front seat FS from an individual seat switch unit; determining whether there is an interference occurrence condition based on current state information of the rear seat RS associated with the front seat FS; restricting the requested rearward movement of the front seat FS when the interference occurrence condition exists; and outputting a non-operation guidance message for a request for the rearward movement of the front seat FS through a display.

The receiving the rearward movement request may include receiving a request for operating at least one of sliding, reclining, height adjusting, and a relax mode and an easy access mode of a one-touch mode.

It is determined that there is the interference occurrence condition when at least one of the following conditions are met: the footrest of the front seat FS is in an open state; and the leg-rest of the rear seat RS is in an open state.

The method of controlling a vehicle seat may further include: after outputting the non-operation guidance message through the display, checking whether a passenger of the rear seat RS is accommodated based on the current state information; first performing an associated operation required for the requested function operation to remove the interference occurrence condition and control the rearward movement when the passenger of the rear seat RS passenger is not in a accommodated state; or displaying an associated operation request input menu through the display when the rear seat RS passenger is accommodated, and removing the interference occurrence condition and controlling the requested rearward movement operation when the association control request is received from the passenger.

According to an exemplary embodiment of the present disclosure, when there is an interference occurrence condition when any one operation request is made while a footrest and a leg-rest are simultaneously applied to a vehicle seat, the requested operation is restricted to prevent damage to parts and passenger injury due to mutual interference.

Furthermore, according to an exemplary embodiment of the present disclosure, it is possible to improve the safety and convenience of passengers by controlling various functions of a seat and an inter-seat associated operation that removes an interference occurrence condition between a footrest and a leg-rest through interference avoidance control logic.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
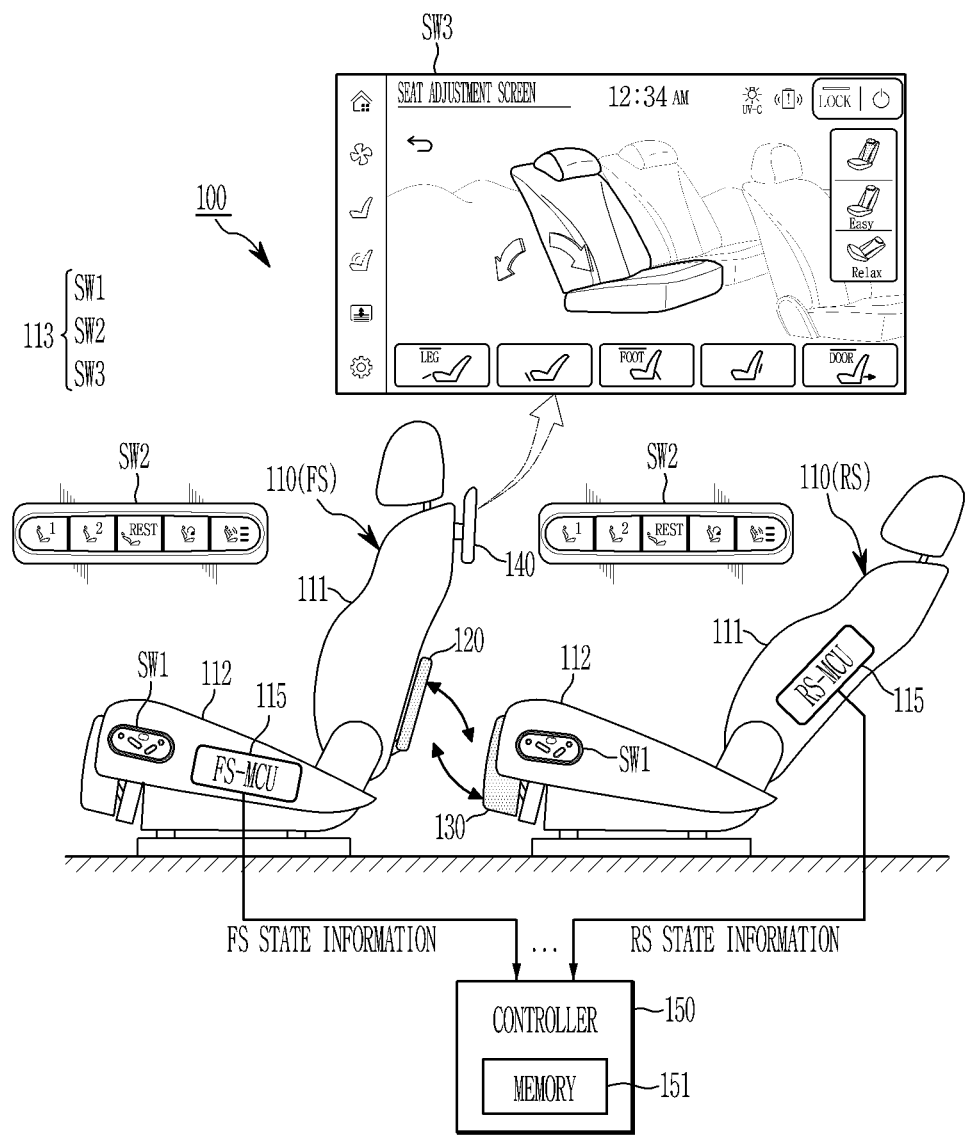
FIG. 1 and FIG. 2 illustrate a conceptual diagram and a configuration of a vehicle seat control system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings so that those skilled in the art to which the present disclosure pertains may easily practice the present disclosure.

The terminology used herein is for describing various exemplary embodiments only, and is not intended to limit the present disclosure. As used herein, singular forms are intended to also include plural forms, unless the context clearly dictates otherwise. The terms "comprises" and/or "comprising," specify the cited features, integers, steps, operations, elements, and/or the presence of components when used herein, but it will also be understood that these terms do not exclude the presence or addition of one or more of other features, integers, steps, operations, elements, components, and/or groups thereof. As used herein, the term "and/or" includes any one or all combinations of the associated listed items.

Terms such as "first", "second", A, B, (a), and (b) may be used to describe various components, but these components are not to be construed as being limited to these terms. These terms are used only to distinguish any component from other components, and a feature, a sequence, or the like, of the corresponding component is not limited by these terms.

Throughout the present specification, it is to be understood that when one component is referred to as being 'connected to' another component, it may be directly connected to another component or be connected to another component with the other component interposed therebetween. On the other hand, it is to be understood that when one component is referred to as being "directly connected to" or "directly coupled to" another component, it may be connected to or coupled to another component without the other component interposed therebetween.

Additionally, it is understood that one or more of the methods below or aspects thereof may be executed by at least one or more controllers. The term "controller" may refer to a hardware device including a memory and a processor. The memory is configured to store program instructions, and the processor is specifically programmed to execute the program instructions to perform one or more processes described in more detail below. A controller may be configured to control operations of units, modules, parts, devices, or the like, as described herein. It is also understood that methods below may be executed by an apparatus including a controller in conjunction with one or more other components, as will be appreciated by those skilled in the art.

Next, a vehicle seat control system and a method therefor according to an exemplary embodiment will be described in detail with reference to the accompanying drawings.

Figure 2:
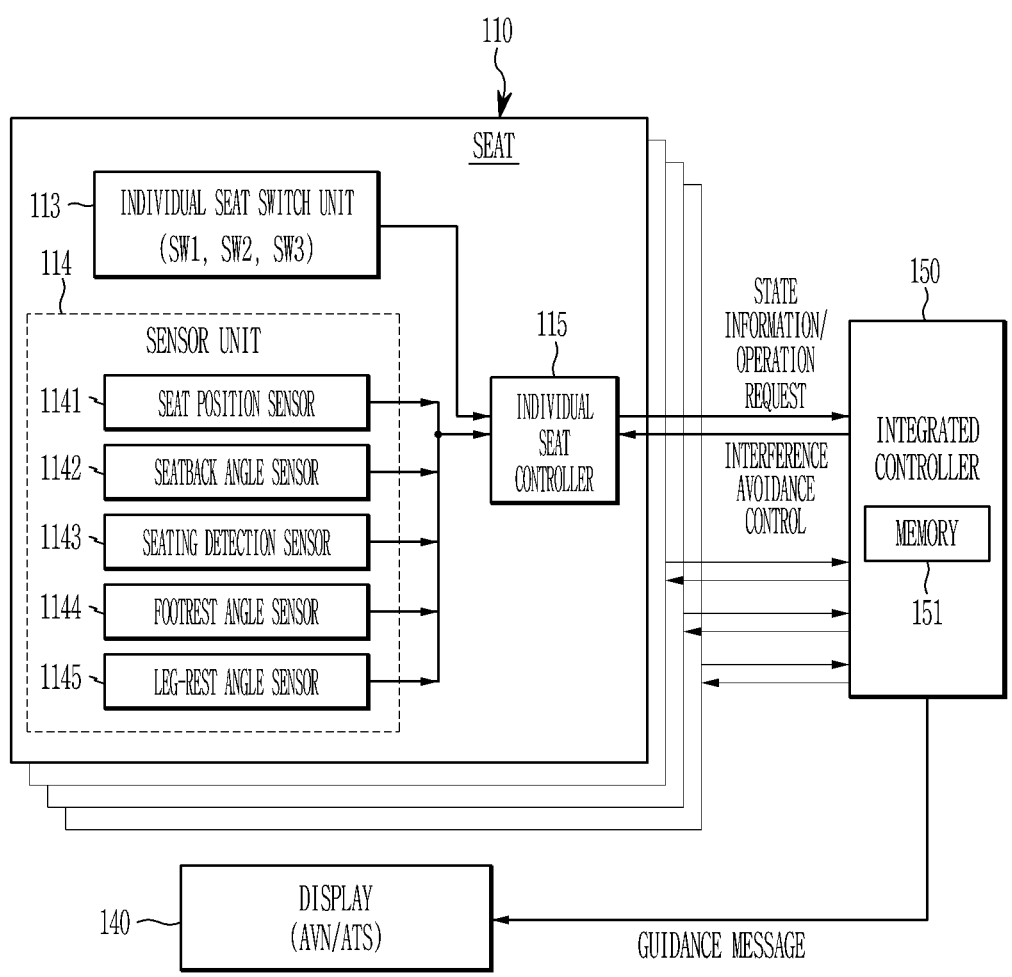

FIG. 1 and FIG. 2 illustrate a conceptual diagram and a configuration of a vehicle seat control system according to an exemplary embodiment of the present disclosure.

Figure 3:
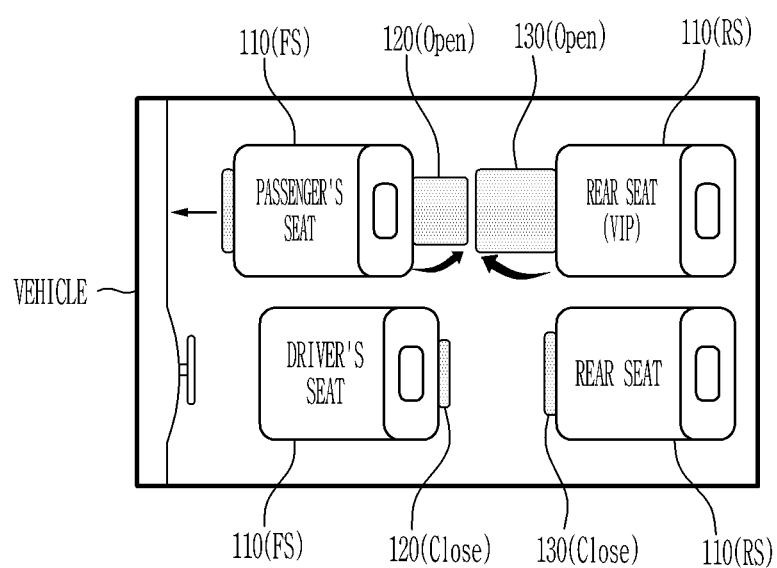
FIG. 3 is a diagram illustrating a vehicle seat arrangement structure according to an exemplary embodiment of the present disclosure.

FIG. 3 is a diagram illustrating a vehicle seat arrangement structure according to an exemplary embodiment of the present disclosure.

Referring to FIG. 1, FIG. 2, and FIG. 3, according to an exemplary embodiment of the present disclosure, a vehicle seat control system 100 includes a multifunctional seat 110 including a front seat FS and a rear seat RS associated with the front seat FS back and forth, a footrest 120 mounted on a rear of a seatback 111 of the front seat FS, a leg-rest 130 mounted on a seat cushion 112 of the rear seat RS disposed at the rear of the front seat FS, an individual seat switch unit 113 mounted on the front seat FS and the rear seat RS, respectively, and an integrated controller 150 configured to determine current state information of an entire seat 110 through sensor units 114 mounted on each seat and to perform interference avoidance control in consideration of current state information of a seat associated with a specific seat when receiving a request for an operation of the footrest 120 or the leg-rest 130 from the individual seat switch unit 113 of the specific seat. Here, the vehicle seat control system 100 may further include a display 140 that provides a seat adjustment screen through a touch screen or pops up a guidance message generated according to the interference avoidance control. The display 140 is an information communication terminal provided on the front seat FS and the rear seat RS, and may include, for example, audio video navigation (AVN), a rear seat display, or the like.

The vehicle includes a passenger vehicle including a structure of a second row seat or more, a sports utility vehicle (SUV), or the like.

The seat 110 is provided with the individual seat switch unit 113, the sensor unit 114, and an individual seat controller 115, respectively. The individual seat controller 115 may be formed of a micro controller unit (MCU).

The seat 110 is divided into the front seat FS including a driver's seat and a passenger's seat and the rear seat RS disposed on the rear of the driver's seat and the passenger's seat, respectively, according to an arrangement position thereof. In the present disclosure, the front seat FS and the rear seat RS parallel to each other are defined as associated seats.

Furthermore, for convenience of explanation, a description will be made assuming a second row seat of a passenger vehicle, but the exemplary embodiment of the present disclosure is not limited thereto, and one or more rear seats (e.g., third row seat) may be further disposed on the second row seat according to a vehicle model. In the instant case, the second row seat may be understood as the front seat FS with respect to the third row seat. That is, the front and rear seats 110 may be divided into the front seat FS and the rear seat RS based on the footrest 120 and the leg-rest 130 mounted to face each other.

The seat 110 is a power seat ergonomically designed so that a passenger may drive in a comfortable posture or take a rest. The seat 110 operates as a mechanical operating element including a slider, a recliner, and a height adjuster for electrically changing its position or posture. The sensor unit 114 is positioned on the operating element to detect operated state information (e.g., movement distance, angle, passenger seating detection, etc.). Furthermore, some seats 110 may further include convenience functions such as massage. The slider is configured for sliding a position of a seat, the recliner is configured for adjusting an angle of the seatback 111, and the height adjuster is configured for adjusting a height of the seat cushion 112. Such an operation function of the seat 110 may refer to the known technology of the power seat.

The individual seat switch unit 113 includes at least one of an integrated memory system (MIS) switch SW1 for operating functions for each seat, a door trim switch SW2 positioned on a door trim, and a display switch SW3 provided through a screen of the display 140. The individual seat switch unit 113 may be provided for each seat.

The individual seat switch unit 113 includes an operation system operating a one-touch mode including a relax mode and an easy access mode, sliding, reclining, height adjusting, and a memory seat mode, and further includes an operation system operating at least one of the footrest, the leg-rest, a getting on mode, and a getting off mode.

The sensor unit 114 includes a seat position sensor 1141, a seatback angle sensor 1142, a seating detection sensor 1143, a footrest angle sensor 1144, and a leg-rest angle sensor 1145.

The seat position sensor 1141 measures a seat position according to a sliding operation distance of the slider and transmits the measured seat position to the integrated controller 150.

The seatback angle sensor 1142 measures the angle of the seatback according to the operation of the recliner and transmits the measured angle of the seatback to the integrated controller 150.

The seating detection sensor 1143 detects whether a passenger is accommodated through the pressure of the seat cushion 112 and transmits the detection result to the integrated controller 150.

The footrest angle sensor 1144 measures an open rotation angle based on a closed state 0° of the footrest 120 and transmits the measured open rotation angle to the integrated controller 150.

The leg-rest angle sensor 1145 measures an open rotation angle based on a closed state 0° of the leg-rest 130 and transmits the measured open rotation angle to the integrated controller 150.

The footrest 120 electrically operates through a first motor 121, closed toward the seatback 111 of the front seat FS when not in use, and open by rotating toward the rear seat RS when in use.

The leg-rest 130 electrically operates through a second motor 131, closed toward the seat cushion 112 of the rear seat RS when not in use, and open by rotating toward the front seat FS when in use.

Here, the close and open refer to a state in which the corresponding footrest 120 and leg-rest 130 are folded inward or stretched outward, and the angle may be adjusted according to the control amount. Furthermore, each of the above-described angle sensors may measure an angle through a Hall sensor of the corresponding motor.

The individual seat controller 115 is provided for each seat to control the operation of the corresponding seat 110.

However, in the exemplary embodiment of the present disclosure, when the seat 110 is individually controlled due to the characteristics of simultaneously applying the footrest 120 and the leg-rest 130 to the vehicle, a mutual interference problem may occur.

Figure 4:
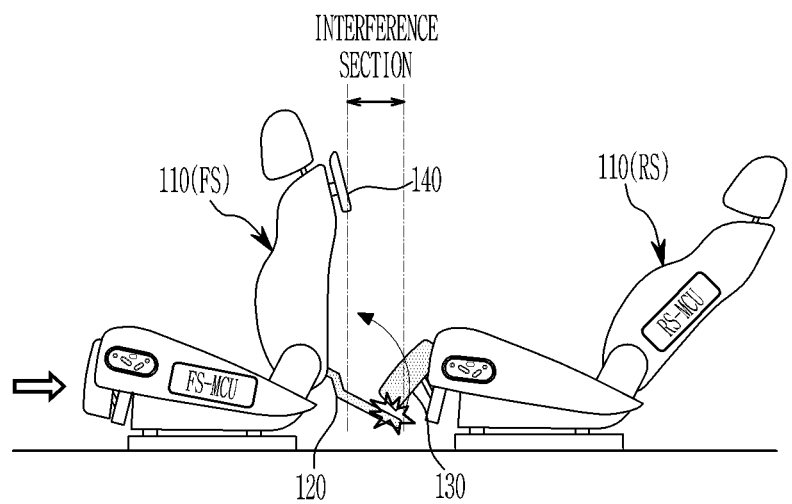
FIG. 4 is a diagram illustrating a representative case of interference when a footrest and a leg-rest are simultaneously applied according to an exemplary embodiment of the present disclosure.
Figure 4:
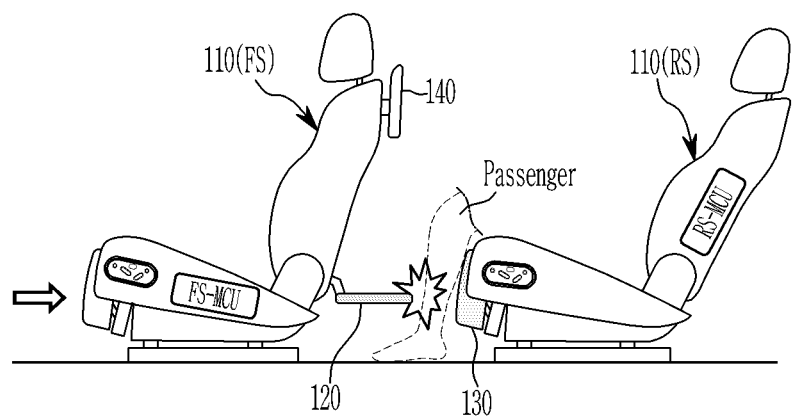

For example, FIG. 4 is a diagram illustrating a representative case of interference when a footrest and a leg-rest are simultaneously applied according to an exemplary embodiment of the present disclosure.

First, referring to Case 1 of FIG. 4, in a state in which the front seat FS is moved rearward and/or in a state in which the seatback is lying at a reference angle or more, a distance from the rear seat RS becomes close, and thus, an interference section occurs. That is, when simultaneously operating the footrest 120 and the leg-rest 130 while a sufficient space is not secured, there is a problem that the operation sections overlap each other, and thus, the interference occurs. Here, the simultaneous operation may be a case where the leg-rest 130 is additionally open in the open state of the footrest 120, or may be a case in which any one of the footrest 120 and the leg-rest 130 is closed in a case opposite to the case or a state in which both of the footrest 120 and the leg-rest 130 are open.

Furthermore, referring to Case 2 of FIG. 4, when the front seat FS slides rearward while the footrest 120 is open, there is a problem of colliding with the rear seat RS or causing injury to a passenger. Here, the case where the front seat FS slides rearward may include a case where a passenger of a driver's seat or a passenger's seat adjusts a seat position through the individual seat switch unit 113, a one-touch mode input, an automatic slide mode when getting on/off the driver's/passenger's seat, and the like.

In the instant case, because the passenger of the driver's seat or the passenger's seat does not recognize the rear seat situation and may input the individual seat switch unit 113 or input even an inexperienced operation, a safe control strategy is required to prevent component damage to parts and passenger injury.

Accordingly, the individual seat controller 115 transmits the current state information collected through the sensor unit 114 after the operation of the corresponding seat 110 to the integrated controller 150 to integrally manage the current state information of the front seat and the rear seat.

Accordingly, when receiving individual seat requests, the individual seat controller 115 integrates the individual seat requests and receives the current information interference avoidance control signal to control the function of the seat 110. In the instant case, the individual seat controller 115 may restrict the execution of the operation instruction for safety in the interference occurrence condition.

The integrated controller 150 is configured to control the overall operation of the vehicle seat control system 100 according to the exemplary embodiment of the present disclosure.

The integrated controller 150 may store at least one program and data for integrally controlling the seat 110 applied to the vehicle in the memory 151 and store data generated according to the operation thereof.

The integrated controller 150 stores, in the memory 151, the interference avoidance control logic considering all possible interference conditions in the passenger's usage conditions when the footrest 120 or leg-rest 130 is requested to operate.

After controlling the seat 110, the integrated controller 150 updates the last (recently) received state information from the individual seat controller 115 in the memory 151 to integrate the current state information of the entire seat 110.

When receiving a function operation request for a specific seat from the individual seat switch unit 113, the integrated controller 150 determines whether there is the interference occurrence condition based on the current state information according to the interference avoidance control logic.

In the instant case, the integrated controller 150 may restrict the operation of the requested function and output a non-operation guidance message through the display 140 when there is the interference occurrence condition as the result of the determination.

Furthermore, the integrated controller 150 transmits, to the individual seat controller 115, a control signal that performs an associated operation required for the requested function operation to permit the requested function operation after removing the interference occurrence condition when there is no passenger accommodated in an associated seat when the requested function operation is restricted. That is, after securing a sufficient space for the requested function operation through the removal of the interference occurrence condition, the integrated controller 150 may transmit the control signal that permits the corresponding function operation.

Furthermore, the integrated controller 150 guides an interference occurrence reason and the associated operation required for avoiding the interference through the display 140 when there is a passenger accommodated in an associated seat when restricting the requested function operation. When an execution instruction of an associated operation is input through the display 140, the integrated controller 150 performs the associated operation required for avoiding the interference to remove the interference occurrence condition and then permit the requested function operation.

Furthermore, the integrated controller 150 may transmit the control signal permitting the operation of the requested function to the individual seat controller 115 when there is no interference occurrence condition as the result of the determination, and output the corresponding operation state information through the displays 140.

The integrated controller 150 may be implemented by at least one process operated by a predetermined program, which may be programmed to perform the respective steps of the vehicle seat control method to which the footrest and the leg-rest are simultaneously applied according to the exemplary embodiment of the present disclosure.

The vehicle seat control method to which the footrest and the leg-rest are simultaneously applied will be described in more detail with reference to the following embodiments and drawings of various seat operation conditions.

Various exemplary embodiments relates to Case 1 problem situation of FIG. 4, and will be described assuming a scenario in which a rear passenger of a front seat (passenger's seat) operates the footrest 120 or the leg-rest 130.

Figure 5:
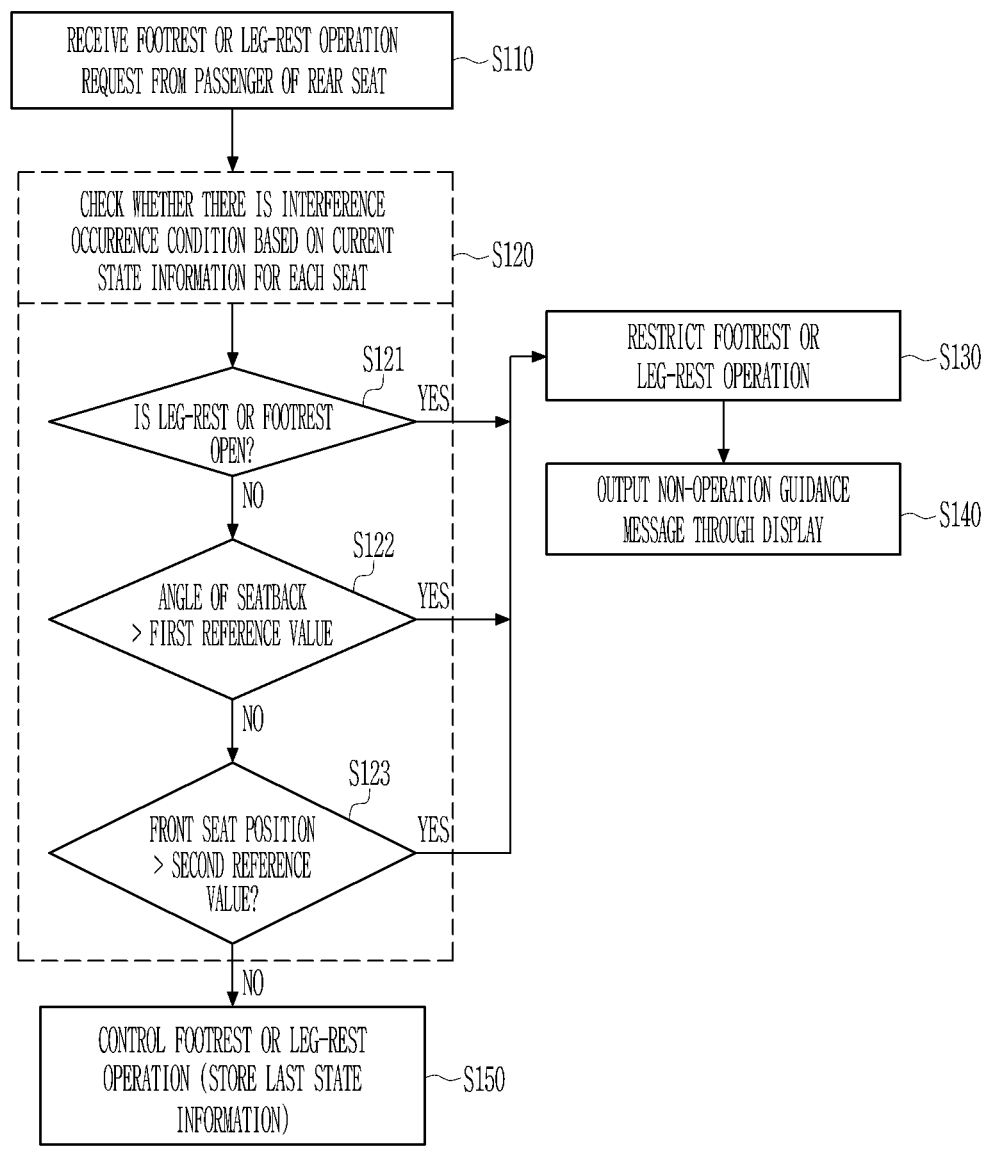
FIG. 5 and FIG. 6 are a flowchart and a reference diagram illustrating a method of controlling a vehicle seat to which a footrest and a leg-rest are simultaneously applied according to various exemplary embodiments of the present disclosure.
Figure 6:
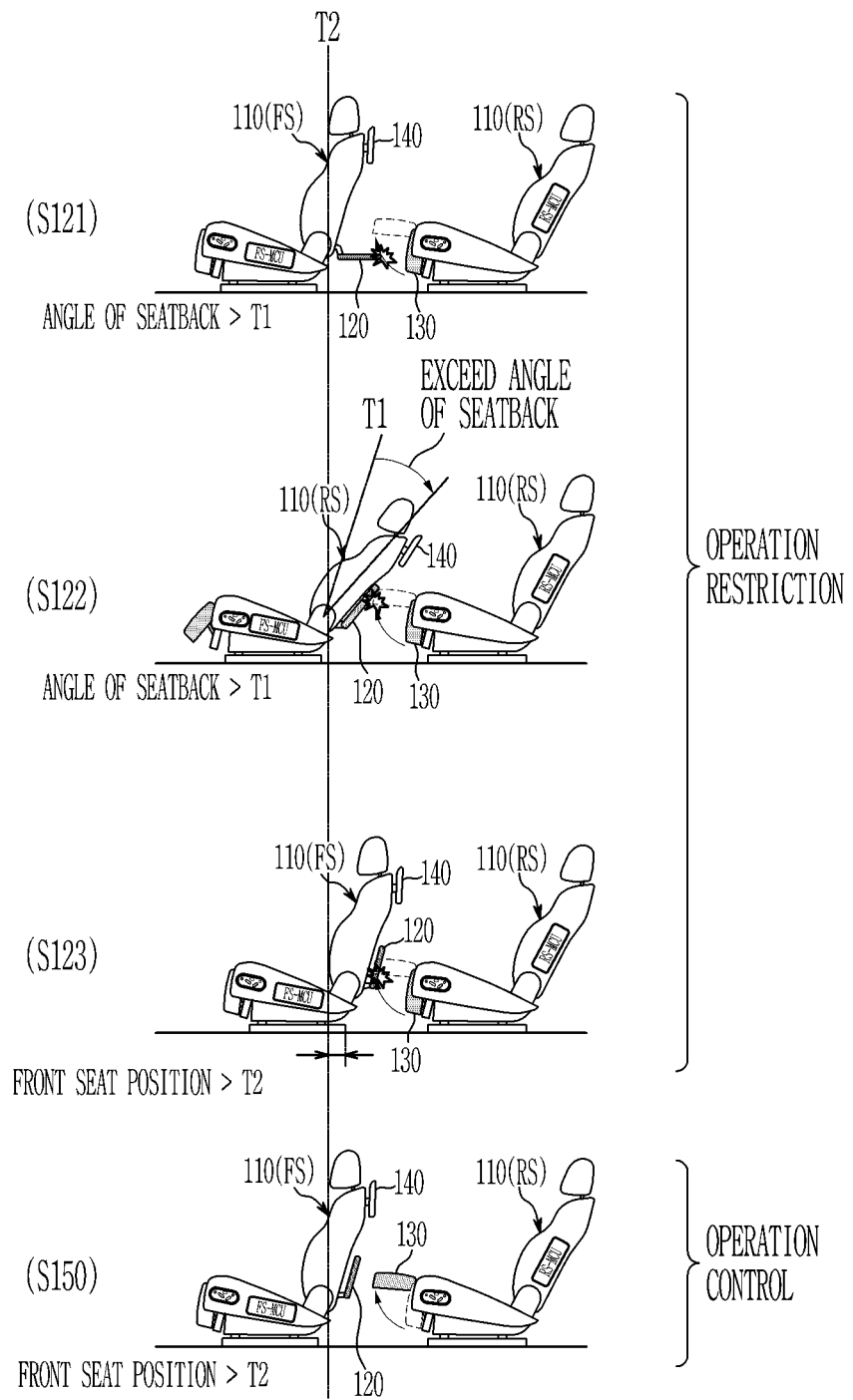

FIG. 5 and FIG. 6 are a flowchart and a reference diagram illustrating a method for controlling a vehicle seat to which a footrest and a leg-rest are simultaneously applied according to various exemplary embodiments of the present disclosure.

Referring to FIG. 5 and FIG. 6, the integrated controller 150 of the vehicle seat control system 100 according to an exemplary embodiment determines whether there is the interference occurrence condition based on the current state information of the front seat FS associated with the rear seat RS when receiving the request for operation of the footrest 120 or the leg-rest 130 according to the operation of the individual seat switch unit 113 of the passenger of the rear seat RS (S120). Here, the request for operation of the footrest 120 or the leg-rest 130 may be an open request or a close request, and for convenience, the following description will be made assuming the open request.

For example, the process of determining whether there is the interference occurrence condition includes checking whether the leg-rest 130 is in an open state in response to the request for operation of the footrest 120 or whether the footrest 120 is in an open state in response to the request for operation of the leg-rest 130 (S121), checking whether the angle of the seatback 111 of the front seat FS exceeds the first reference value T1 and is in a state lying rearward (S122), and checking whether the position of the front seat FS exceeds the second reference value T2 and crosses backward (S123). Here, the conditions of each step are for detecting whether the current state information corresponds to the mutual interference occurrence condition when the footrest 120 or the leg-rest 130 operates.

In the instant case, when none of the conditions of steps S121 to S123 is satisfied, and thus, when it is determined that there is no current interference occurrence condition (S121 and S122 and S123; No), the integrated controller 150 may control the operation of the footrest 120 or the leg-rest 130 (S150). Furthermore, the integrated controller 150 may update the last (recently) received state information in the memory 151 after completing the operation of the footrest 120 or the leg-rest 130.

On the other hand, the integrated controller 150 determines that there is the current interference occurrence condition when at least one of the conditions of steps S121 to S123 is satisfied (S121 or S122 or S123; Yes), and restricts the operations of the requested footrest 120 or the leg-rest 130 (S130).

Figure 7A:
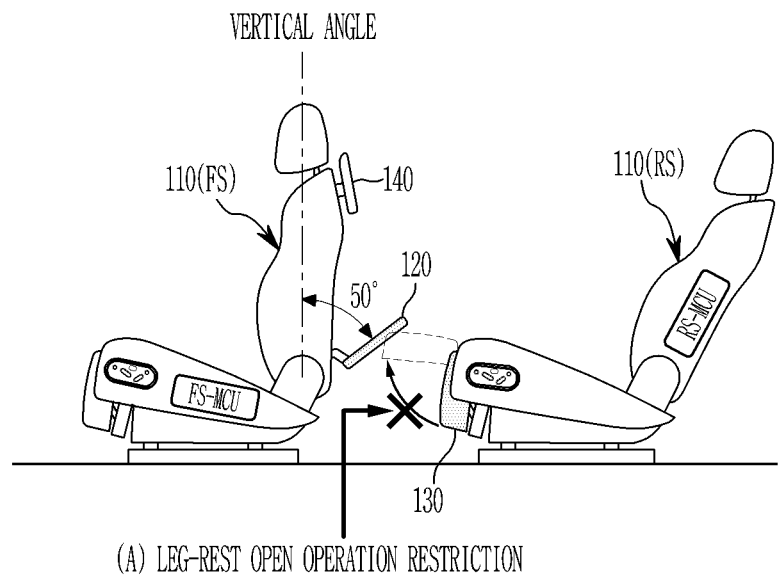
FIG. 7A and FIG. 7B are diagrams illustrating an example of restricting an operation according to an exemplary embodiment of the present disclosure.
Figure 7B:
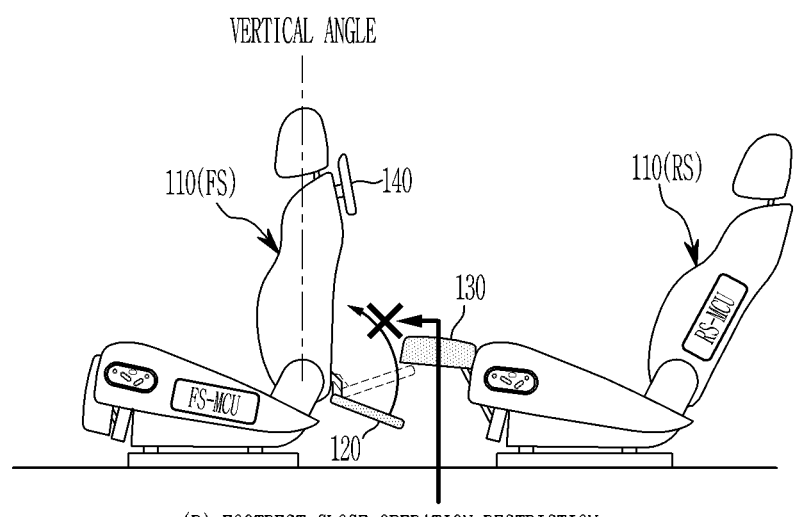

For example, FIG. 7A and FIG. 7B are diagrams illustrating an example of restricting an operation according to an exemplary embodiment of the present disclosure.

First, referring to FIG. 7A, the integrated controller 150 restricts the open operation of the leg-rest 130 to prevent the interference while the footrest 120 is open by a predetermined angle (e.g., 50°) or more based on the vertical angle of the seatback when the request to open the leg-rest 130 is input from the individual seat switch unit 113. Furthermore, in the present way, the integrated controller 150 may restrict the open operation of the footrest 120 to prevent the interference while the leg-rest 130 is in an open state by a predetermined angle or more when the request to open the footrest 120 is input.

Next, referring to FIG. 7B, the integrated controller 150 may restrict the close operation of the footrest 120 to prevent the interference while the leg-rest 130 is simultaneously open by a predetermined angle or more when the request to close the footrest 120 is input from the individual seat switch unit 113. Furthermore, in the present way, the integrated controller 150 may restrict the close operation of the leg-rest 130 to prevent the interference while the footrest 120 is in an open state by a predetermined angle or more when the request to close the leg-rest 130 is input.

Thereafter, the integrated controller 150 outputs the non-operation guidance message for the requested footrest 120 or leg-rest 130 through the display 140 (S140). For example, the non-operation guidance message may display guidance (Yes; there is not enough space. First, please adjust the passenger's seat position) for an interference occurrence reason and an associated operation required for avoiding the interference, and output a guidance voice.

Figure 8:
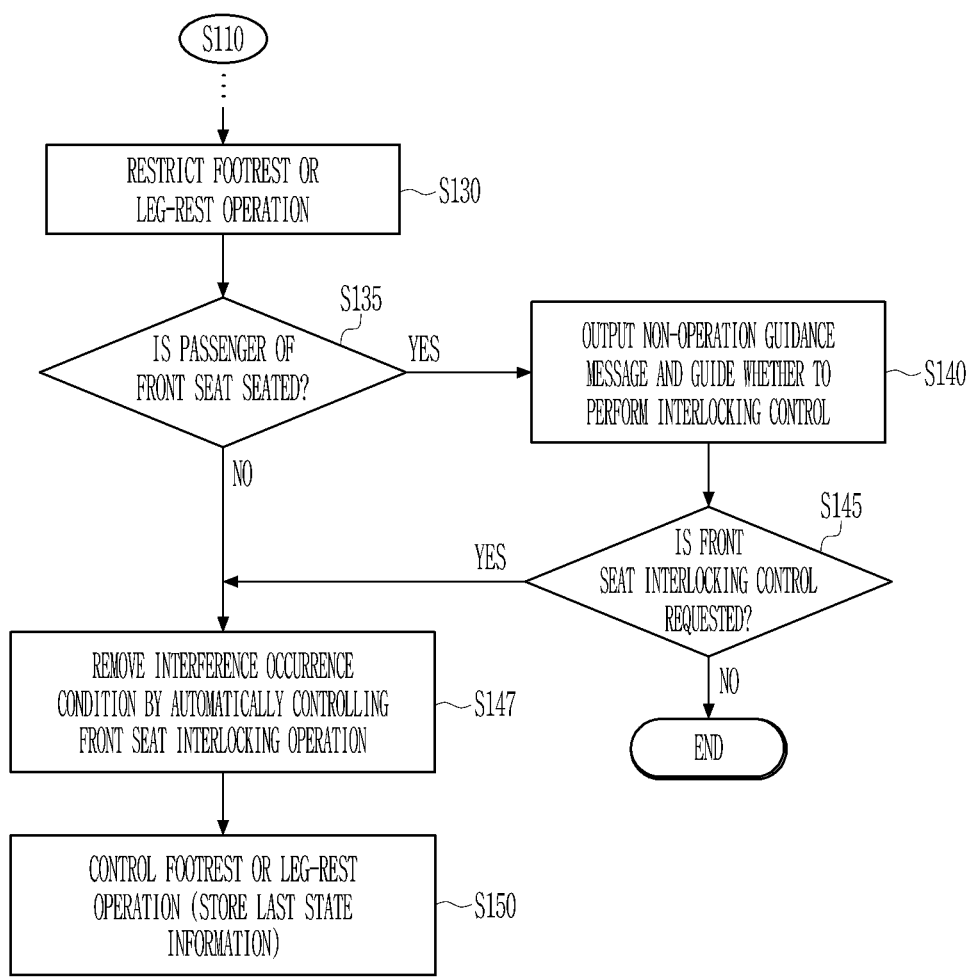
FIG. 8 is a flowchart illustrating an inter-seat association control method according to the various exemplary embodiments of the present disclosure.

Meanwhile, FIG. 8 is a flowchart illustrating an inter-seat association control method according to the various exemplary embodiments of the present disclosure.

The inter-seat association control method according to the various exemplary embodiments in FIG. 8 differs only in that inter-seat association control logic is added after step S130 of restricting the operation of the function requested in FIG. 5 described above. Therefore, a description similar to the flow of FIG. 5 will be omitted and the added logic will be mainly described.

Referring to FIG. 8, in the step S130, the integrated controller 150 restricts the operation of the footrest 120 or the leg-rest 130 due to the presence of the current interference occurrence condition (S130), and then, checks whether the passenger of the front seat FS is accommodated based on the current state information (S135). Here, the reason for checking the accommodated state of the passenger of the front seat FS is that the passenger of the front seat FS may be surprised or dangerous when the associated operation of the front seat FS is automatically controlled to secure the necessary space through the interference avoidance.

Therefore, the integrated controller 150 first performs the associated operation required for the requested operation of the footrest or the leg-rest to remove the interference occurrence condition when the passenger of the front seat FS is not in the accommodated state (135; No) (S147). Here, the process of removing the interference occurrence condition by the associated operation may include at least one of closing the leg-rest 130 or footrest 120 in the open state, adjusting an angle of the seatback 111 of the front seat FS to be within the first reference value T1, and moving the position of the front seat FS forward within the second reference value T2.

The integrated controller 150 removes the interference occurrence condition and then is configured to control the requested operation of the footrest or the leg-rest (S150).

On the other hand, when the passenger of the front seat FS is in the accommodated state (135; Yes), the integrated controller 150 may output the non-operation guidance message for the requested footrest 120 or leg-rest 130 through the display 140, but may further display the associated operation request input menu (e.g., do you want to adjust the front seat position? "Yes/No") (S140).

Then, when receiving the association control request input through the display 140 with the consent of the passenger (S145; Yes), the integrated controller 150 first performs the associated operation required for the requested foot brake or leg-rest operation to remove the interference occurrence condition (S147) and perform the control of the requested function operation (S150).

On the other hand, the integrated controller 150 receives a rejection (cancellation) of the request for the associated operation from the passenger or ends the operation request when there is no menu input for a predetermined time period (S145; No).

Various exemplary embodiments relates to the problem situation of Case 2 of FIG. 4, and will be described assuming a scenario in which a passenger moves a front seat (passenger's seat) rearward while the footrest 120 or the leg-rest 130 operates.

Figure 9:
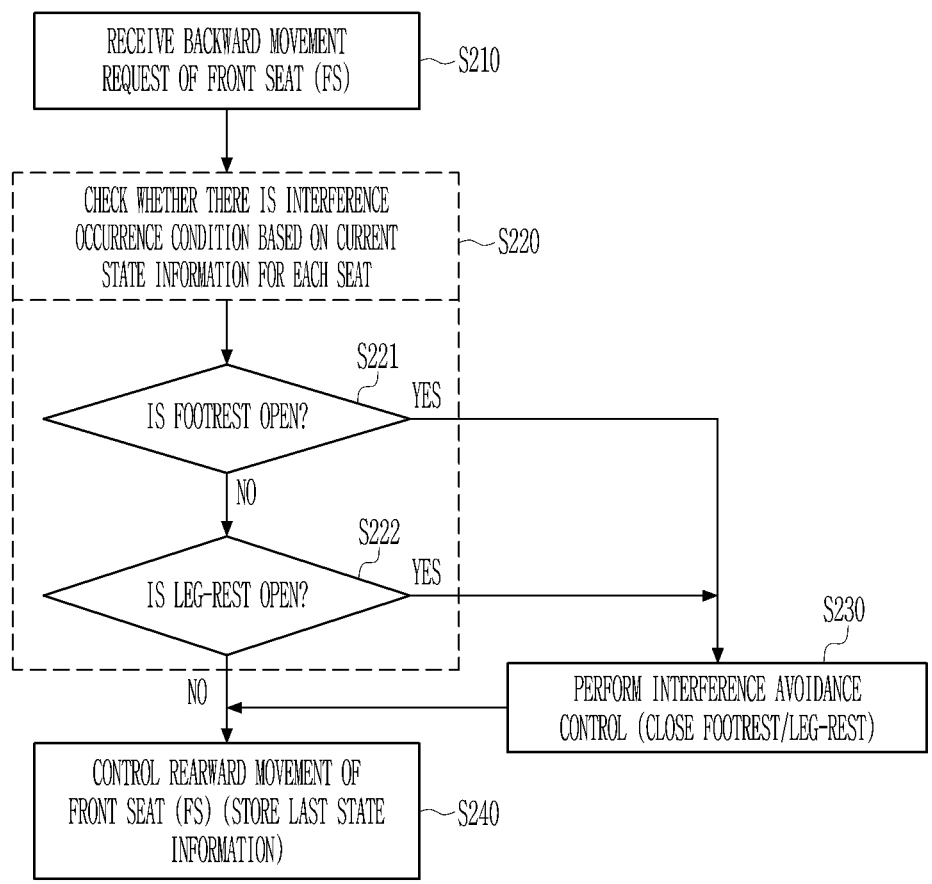
FIG. 9 and FIG. 10 are a flowchart and a reference diagram illustrating a method of controlling a vehicle seat to which a footrest and a leg-rest are simultaneously applied according to various exemplary embodiments of the present disclosure.
Figure 10:
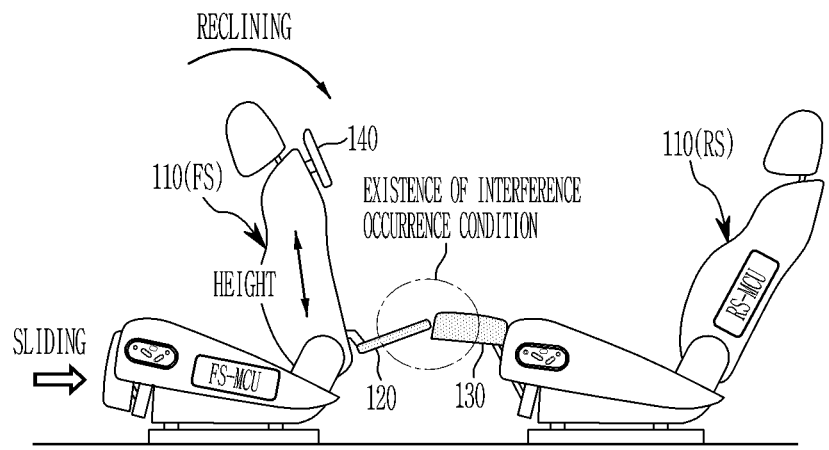
Figure 10:
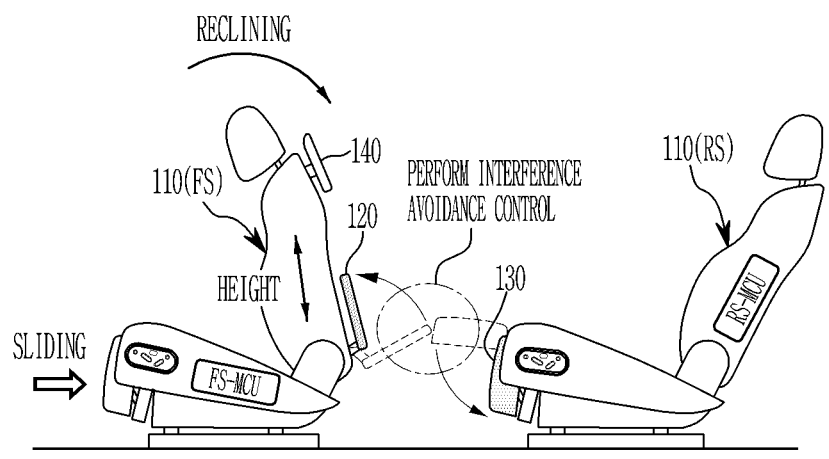

FIG. 9 and FIG. 10 are a flowchart and a reference diagram illustrating a vehicle seat control method to which a footrest and a leg-rest are simultaneously applied according to various exemplary embodiments of the present disclosure.

Referring to FIG. 9 and FIG. 10, the integrated controller 150 of the vehicle seat control system 100 according to an exemplary embodiment determines whether there is the interference occurrence condition based on the current state information of the front seat FS and the rear seat RS (S220) when receiving the rearward movement request of the rear seat RS associated with the front seat FS according to the operation of the individual seat switch unit 113 of the passenger (S210). Here, the request for the rearward movement of the front seat FS is made by at least one of sliding, height, and reclining, and it will be described below as a request for the sliding movement of the front seat FS.

The process of determining whether there is the interference occurrence condition includes checking whether the footrest 120 of the front seat FS is in an open state (S221), and checking whether the leg-rest 130 of the rear seat RS is in an open state (S222). Here, the conditions of each step are for detecting whether the current state information corresponds to the mutual interference occurrence condition when the front seat FS moves rearward thereof.

In the instant case, when all the conditions of steps S221 to S222 are not satisfied, the integrated controller 150 determines that there is no current interference occurrence condition (S221 and S222; No), and is configured to control the rearward movement of the front seat FS (S240). Furthermore, the integrated controller 150 may update the last received state information in the memory 151 after the rearward movement of the front seat FS is completed.

On the other hand, the integrated controller 150 determines that there is the current interference occurrence condition when any one of the conditions of steps S221 and S222 is satisfied (S221 or S222; Yes), and secures a space through the control of the interference avoidance by operating the footrest 120 and/or leg-rest 130 in the open state to be closed.

Thereafter, the integrated controller 150 may control the rearward movement of the front seat FS (S240) and update the last received state information in the memory 151.

The present exemplary embodiments are an expanded concept including the various exemplary embodiments of the present disclosure in FIG. 9, and will be described assuming a scenario in which a passenger operates a one-touch mode (relax/easy access) while the footrest 120 or the leg-rest 130 operates.

Figure 11:
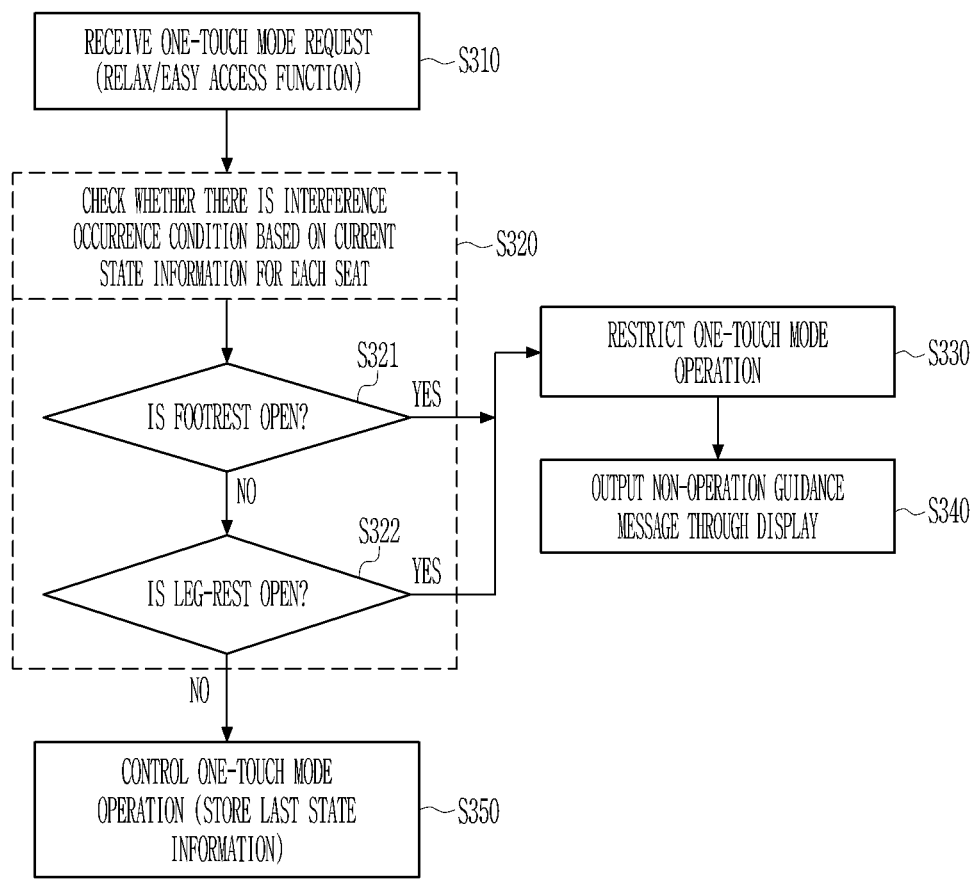
FIG. 11 is a flowchart illustrating a method of controlling a vehicle seat to which a footrest and a leg-rest are simultaneously applied according to various exemplary embodiments of the present disclosure.

FIG. 11 is a flowchart illustrating a vehicle seat control method to which a footrest and a leg-rest are simultaneously applied according to various exemplary embodiments of the present disclosure.

Referring to FIG. 11, the integrated controller 150 of the vehicle seat control system 100 according to the exemplary embodiment of the present disclosure receives a one-touch mode request according to the operation of the individual seat switch unit 113 of the passenger (S310).

The one-touch mode includes relax and easy access functions, and narrows an interval due to movement between seats when any one of the relax and easy access functions operates, causing an interference section between the footrest 120 and the leg-rest 130. For example, the relax function automatically adjusts the sliding, reclining, and height of the seat with one touch to operate a passenger's posture to be at a zero-gravity neutral position so that a passenger's posture becomes zero-gravity-neutral, and the front seat FS moves to the rear, and the rear seat RS moves forward to narrow the interval between the seats (see FIG. 10). Furthermore, the easy access includes a memory seat function that automatically adjusts the interval and height angle of the front seat FS to suit a driver's body type, and the interval between the seats is narrowed according to the rearward movement of the front seats FS during operation.

The integrated controller 150 determines whether there is the interference occurrence condition based on the current state information for each associated seat in response to the one-touch mode request of the front seat FS or the rear seat RS (S320).

The process of determining whether there is the interference occurrence condition includes checking whether the footrest 120 mounted on the rear of the seatback 111 of the front seat FS is in the open state (S321), and checking whether the leg-rest 130 mounted on the seat cushion 112 of the rear seat RS is in an open state (S322). Here, the conditions of each step are for detecting whether the current state information corresponds to the mutual interference occurrence condition when the front seat FS moves rearward or the rear seat RS moves forward thereof.

In the instant case, when all the conditions of steps S221 to S222 are not satisfied, and thus, the integrated controller 150 determines that there is no current interference occurrence condition (S321 and S322; No), the integrated controller 150 is configured to control the corresponding function of the one-touch mode (S240). Furthermore, the integrated controller 150 may update the last received state information in the memory 151 after the rearward movement of the front seat FS is completed.

On the other hand, the integrated controller 150 determines that there is the current interference occurrence condition when any one of the conditions of steps S321 and S322 is satisfied (S321 or S322; Yes), and restricts the operation of the one-touch mode (S330).

The integrated controller 150 outputs a non-operation guidance message for the requested one-touch mode through the display 140 (S340). For example, the non-operation guidance message may display guidance (Yes; there is not enough space. First, please close the footrest/leg-rest) for an interference occurrence reason and an associated operation required for avoiding the interference, and output a guidance voice.

Figure 12:
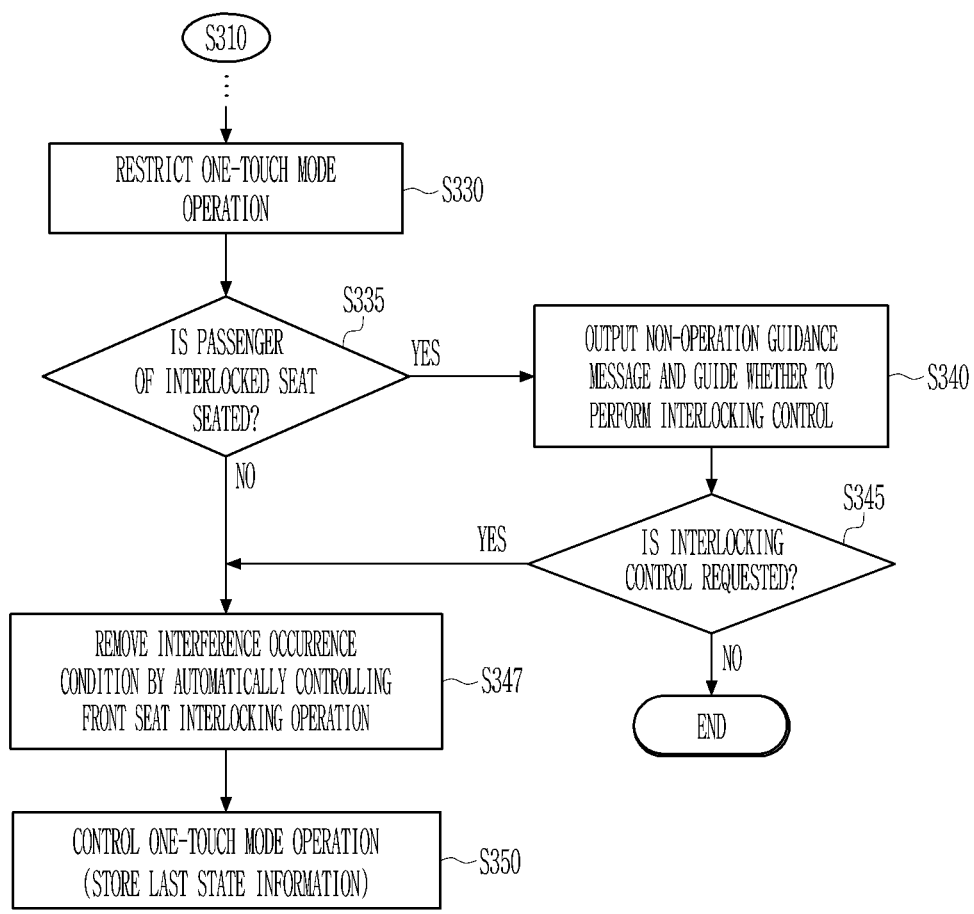
FIG. 12 is a flowchart illustrating an inter-seat association control method according to the various exemplary embodiments of the present disclosure.

Meanwhile, FIG. 12 is a flowchart illustrating an inter-seat association control method according to the various exemplary embodiments of the present disclosure.

The inter-seat association control method according to the present exemplary embodiments differ only in that inter-seat association control logic is added after step S330 of restricting the operation of the one-touch mode requested in FIG. 11 described above. Therefore, a description similar to the flow of FIG. 11 will be omitted and the added logic will be mainly described.

Referring to FIG. 12, the integrated controller 150 restricts the operation of the one-touch mode due to the presence of the current interference occurrence condition in step S330, and then checks a accommodated state of a passenger of a seat associated with a seat requesting the one-touch mode based on the current state information (S335). That is, when the passenger of the front seat FS requests the one-touch mode, the accommodated state of the passenger of the rear seat RS may be checked or vice versa.

When the passenger is not accommodated in the associated seat (335; No), the integrated controller 150 automatically controls the associated operation to remove the interference occurrence condition (S347). For example, the process of automatically controlling the associated operation for the front seat FS includes automatically closing, by the integrated controller 150, the footrest 120 in the open state and automatically closing the leg-rest 130 in the open state.

On the other hand, when the passenger is accommodated in the interlocked state (335; Yes), the integrated controller 150 may output the non-operation guidance message for the one-touch mode through the display 140, but may further display the associated operation request input menu (e.g., do you want to close the footrest/leg-rest? "Yes/No") (S340).

Thereafter, when receiving the association control request input through the display 140 with the consent of the passenger (S345; Yes), the integrated controller 150 automatically controls the associated operation required for avoiding the interference to remove the interference occurrence condition (S347) and perform the requested one-touch mode operation control (S350).

On the other hand, the integrated controller 150 receives a rejection (cancellation) of the request for the associated operation from the passenger or ends the operation request when there is no menu input for a predetermined time period (S345; No).

As described above, according to an exemplary embodiment of the present disclosure, when there is an interference occurrence condition when any one operation request is made while the footrest and the leg-rest are simultaneously applied to a vehicle seat, the requested operation is restricted to prevent damage to parts and passenger injury due to mutual interference.

Furthermore, according to an exemplary embodiment of the present disclosure, it is possible to improve the safety and convenience of passengers by controlling various functions of a seat and an inter-seat associated operation that removes an interference occurrence condition between a footrest and a leg-rest through interference avoidance control logic.

In the above, various embodiments of the present disclosure have been described, but the present disclosure is not limited to the above-described embodiments, and may be variously added and changed while understanding the above-described embodiments.

For example, the various exemplary embodiments shown in FIG. 11 above was described, including the scenario in which the passenger operates the memory seat function of the easy access during the one-touch mode while the footrest 120 or the leg-rest 130 operates. However, the exemplary embodiment of the present disclosure is not limited thereto, and may apply the interference avoidance control logic to the automatic slide function during the getting on/off mode of the easy access.

Figure 13:
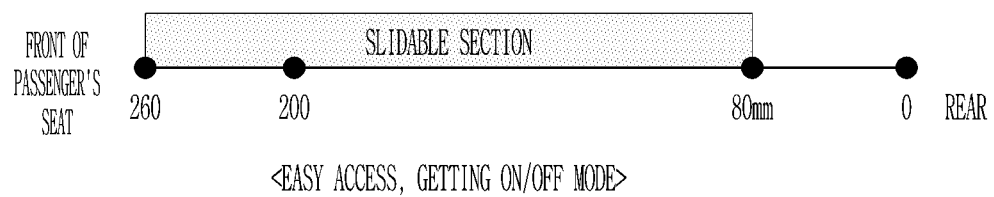
FIG. 13 is a diagram illustrating a method of controlling a vehicle seat in a getting on/off mode of easy access according to another exemplary embodiment of the present disclosure.
Figure 13:
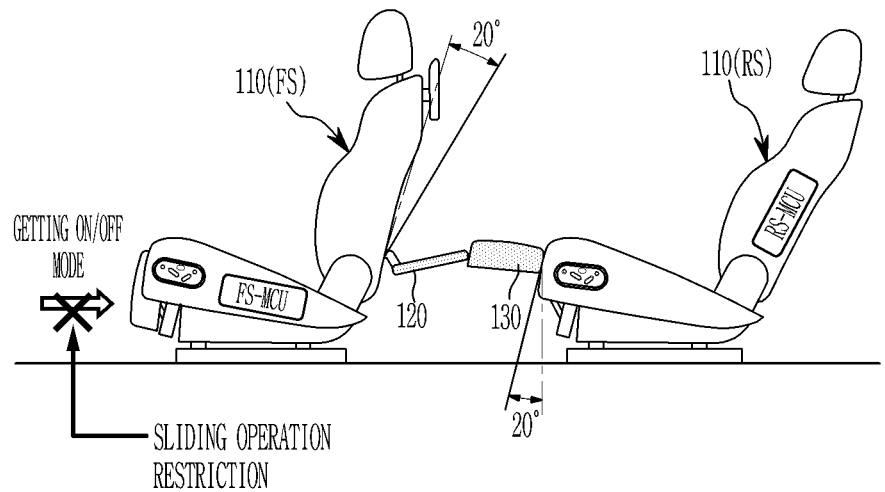

FIG. 13 is a diagram illustrating a method for controlling a vehicle seat in a getting on/off mode of easy access according to another exemplary embodiment of the present disclosure.

Referring to FIG. 13, the passenger seat FS to which the getting on/off mode of the easy access is applied automatically slides rearward according to the request memorized in the switch unit or the individual seat controller when the door is open, and automatically slides forward when the door is closed.

The integrated controller 150 secures a knee space of the passenger of the rear seat RS by setting the slidable section so that the rearward movement is possible only to a predetermined point (e.g., 80 mm) when the door is open in the getting on/off mode. However, when the passenger seat FS slides rearward in the condition in which the footrest 120 and/or the leg-rest 130 is open, since the knee space of the passenger may not be secured, the passenger seat FS may apply an impact.

Accordingly, the integrated controller 150 may limit the rear sliding operation when the footrest 120 or the leg-rest 130 is open at a predetermined angle (e.g., 20°) or more in the getting on/off mode.

Furthermore, when the driving of the vehicle is terminated while the footrest 120 or the leg-rest 130 is in the open state, it may be difficult for the passenger to get on the vehicle during re-driving.

Accordingly, the integrated controller 150 may reset the footrest 120 and the leg-rest 130 in the open state and control the footrest 120 and the leg-rest 130 to be in the closed state under the condition that there is no accommodated passenger after the engine is turned off.

In an exemplary embodiment of the present invention, the integrated controller 150 and the individual seat controller 115 may be integrated into a single controller.

The exemplary embodiments of the present disclosure described above are not implemented only through the apparatus and/or the method described above, but may also be implemented through programs executing functions corresponding to configurations of the exemplary embodiments of the present disclosure, a recording medium in which the programs are recorded, and the like. Furthermore, these implementations may be easily made by those skilled in the art to which the present disclosure pertains from the exemplary embodiments described above.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle seat control system, comprising:
   a front seat;
   a rear seat located behind and being longitudinally in-line with the front seat;
   a footrest mounted on a rear of a seatback of the front seat;
   a leg-rest mounted on a seat cushion of the rear seat located behind and being longitudinally in-line with the front seat;
   an individual seat switch unit mounted on the front seat and the rear seat, respectively; and
   an integrated controller configured to determine current state information of the front seat and the rear seat through sensor units mounted on each of the front seat and the rear seat and, when receiving a request for an operation of the footrest or the leg-rest from the respective individual seat switch unit of one of the front seat and the rear seat, to perform interference avoidance control in consideration of current state information of the other of the front seat and the rear seat.

2. The vehicle seat control system of claim 1, wherein the individual seat switch unit includes:
   an operation system for operating a one-touch mode including a relax mode and an easy access mode, sliding, reclining, height adjusting, and a memory seat mode; and
   an operation system for operating at least one of the footrest, the leg-rest, a getting on mode, and a getting off mode.

3. The vehicle seat control system of claim 1, wherein the sensor units include:
   a seat position sensor configured for measuring a seat position according to a sliding operation distance of a slider;
   a seating detection sensor configured for detecting whether a passenger is accommodated through a pressure of a seat cushion;
   a footrest angle sensor configured for measuring a first open rotation angle based on a closed state 0° of the footrest; and
   a leg-rest angle sensor configured for measuring a second open rotation angle based on the closed state 0° of the leg-rest.

4. The vehicle seat control system of claim 1, further including:
   an individual seat controller provided for each seat to control a function of a corresponding seat; and
   a display configured to provide a seat adjustment screen or to pop up a guidance message generated according to the interference avoidance control.

5. The vehicle seat control system of claim 4, wherein the individual seat controller is configured to control operation of the corresponding seat and then to transmit the current state information collected through a sensor unit to the integrated controller, to integrally manage the current state information of the front seat and the rear seat.

6. The vehicle seat control system of claim 4, wherein the individual seat controller is configured to transmit a function operation request to the integrated controller when receiving the function operation request from the individual seat switch unit, and to receive an interference avoidance control signal considering the current state information of the front seat and the rear seat to control a function of the front seat and the rear seat.

7. The vehicle seat control system of claim 1, wherein the integrated controller is configured to store, in a memory, an interference avoidance control logic considering interference conditions in a passenger's usage condition when the operation of the footrest or the leg-rest is requested.

8. The vehicle seat control system of claim 7, wherein the integrated controller is configured to determine whether there is an interference occurrence condition based on the current state information according to the interference avoidance control logic when receiving a function operation request of one seat among the front seat and the rear seat, through the individual seat switch unit, and to restrict a requested function operation and output a non-operation message through a display when there is the interference occurrence condition.

9. The vehicle seat control system of claim 8, wherein the integrated controller is configured to:
   perform an associated operation required for the requested function operation to remove the interference occurrence condition and then permit the requested function operation when there is no passenger accommodated in an associated seat when the requested function operation is restricted,
   provide an interference occurrence reason and the associated operation required for avoiding an interference between operations of the front seat and the rear seat through the display when there is a passenger accommodated in the associated seat when restricting the requested function operation, and
   perform the associated operation required for avoiding the interference to remove the interference occurrence condition and then permit the requested function operation when an instruction to execute the associated operation is input.

10. A method of controlling a vehicle seat system having a footrest on a front seat and a leg-rest on a rear seat the method comprising:
    receiving a request for operating the footrest or the leg-rest according to an operation of an individual seat switch unit of a passenger in the rear seat;
    determining, by a controller, whether there is an interference occurrence condition based on current state information of the front seat associated with the rear seat;
    restricting, by the controller, the requested operation of the footrest or the leg-rest when the interference occurrence condition is satisfied; and
    outputting a non-operation guidance message for the request of the operation of the footrest or the leg-rest through a display.

11. The method of claim 10, wherein controller concludes that there is the interference occurrence condition when at least one of following conditions is satisfied:
    the leg-rest is in an open state in case of the request to operate the footrest, or the footrest is in an open state in case of the request to operate the leg-rest;
    an angle of a seatback of the front seat exceeds a first reference value and is in a state lying rearward thereof; and
    a position of the front seat exceeds a second reference value and crosses rearward thereof.

12. The method of claim 10, further including, after outputting the non-operation guidance message through the display:

checking, by the controller, whether a passenger of the front seat is accommodated based on the current state information;

performing, by the controller, an associated operation required for the requested operation of the footrest or the leg-rest to remove the interference occurrence condition when the passenger of the front seat is not in an accommodated state; and controlling, by the controller, the requested operation of the footrest or the leg-rest.

13. The method of claim 12, wherein the removing of the interference occurrence condition includes at least one of:

closing the leg-rest or the footrest in an open state;

adjusting an angle of a seatback of the front seat to be within a first reference value; and moving a position of the front seat forward within a second reference value.

14. The method of claim 12, wherein the removing of the interference occurrence condition further includes:

displaying an associated operation request input menu through the display when the passenger of the front seat is accommodated; and performing the associated operation required for the requested operation of the footrest or the leg-rest to remove the interference occurrence condition when receiving an association control request input through the display.

15. A method of controlling a vehicle seat system having a footrest on a front seat and a leg-rest on a rear seat, the method comprising:

receiving, by a controller operatively connected to an individual seat switch unit, a request of a rearward movement of the front seat from the individual seat switch unit;

determining, by the controller, whether there is an interference occurrence condition based on current state information of the rear seat and the front seat;

restricting, by the controller, the requested rearward movement of the front seat when the interference occurrence condition exists; and outputting, by the controller, a non-operation guidance message for the request of the rearward movement of the front seat through a display operatively connected to the controller.

16. The method of claim 15, wherein the receiving the request of the rearward movement includes:

receiving a request for operating at least one of sliding, reclining, height adjusting, and a relax mode and an easy access mode of a one-touch mode.

17. The method of claim 15, wherein the controller concludes that there is the interference occurrence condition when at least one of following conditions are satisfied:

the footrest of the front seat is in an open state; and the leg-rest of the rear seat is in an open state.

18. The method of claim 15, further including, after outputting the non-operation guidance message through the display:

checking, by the controller, whether a passenger of the rear seat is accommodated based on the current state information;

performing, by the controller, an associated operation required for a requested function operation to remove the interference occurrence condition and control the rearward movement of the front seat when the passenger of the rear seat is not in an accommodated state; or displaying, by the controller, an associated operation request input menu through the display when the passenger of the rear seat is accommodated, and removing the interference occurrence condition and controlling the requested rearward movement when the association control request is received from the passenger.

* * * * *